(12) United States Patent
Tanaka et al.

(10) Patent No.: US 7,079,146 B2
(45) Date of Patent: Jul. 18, 2006

(54) IMAGE PRODUCING DEVICE

(75) Inventors: Masayoshi Tanaka, Kanagawa (JP);
Teiji Yutaka, Kanagawa (JP);
Masakazu Suzuoki, Tokyo (JP)

(73) Assignee: Sony Computer Entertainment Inc. (JP)

( * ) Notice: Subject to any disclaimer, the term of this patent is extended or adjusted under 35 U.S.C. 154(b) by 147 days.

(21) Appl. No.: 09/797,514

(22) Filed: Mar. 1, 2001

(65) Prior Publication Data

US 2002/0060690 A1    May 23, 2002

(30) Foreign Application Priority Data

Mar. 2, 2000    (JP)    ............................. 2000-058053

(51) Int. Cl.
G06F 15/16    (2006.01)
G06F 15/80    (2006.01)
G06F 13/18    (2006.01)

(52) U.S. Cl. .................. 345/502; 345/503; 345/504; 345/505; 345/535

(58) Field of Classification Search ........ 345/502–505, 345/619, 535, 522, 553, 545; 712/9
See application file for complete search history.

(56) References Cited

U.S. PATENT DOCUMENTS

| | | | |
|---|---|---|---|
| 5,473,750 A |  | 12/1995 | Hattori |
| 5,485,559 A | * | 1/1996 | Sakaibara et al. |
| 5,781,199 A | * | 7/1998 | Oniki et al. |
| 5,953,019 A | * | 9/1999 | Shimakawa et al. |
| 6,119,217 A |  | 9/2000 | Suzuoki |
| 6,181,346 B1 | * | 1/2001 | Ono et al. .................. 345/503 |
| 6,304,952 B1 |  | 10/2001 | Suzuoki |

FOREIGN PATENT DOCUMENTS

| | | |
|---|---|---|
| JP | 4-348485 A | 12/1992 |
| JP | 05-189550 A | 7/1993 |
| JP | 06-332430 A1 | 12/1994 |
| JP | 06-162206 A1 | 6/1995 |
| JP | 08-138059 A | 5/1996 |
| JP | 09-282470 A1 | 10/1997 |
| JP | 09-325759 A1 | 12/1997 |
| JP | 10-269351 A | 10/1998 |

OTHER PUBLICATIONS

John G. Torborg ("A Parallel Processor Architecture for Graphics Arithmetic Operations") Computer Graphics, vol. 21, No. 4, Jul. 1987.*

(Continued)

*Primary Examiner*—Kee M. Tung
*Assistant Examiner*—Hau Nguyen
(74) *Attorney, Agent, or Firm*—Lerner, David, Littenberg, Krumholz & Mentlik, LLP

(57) ABSTRACT

An image producing device includes two or more vector processors for conducting geometry processing for expressing the respective images in parallel to produce graphic element lists, a graphic processor for conducting graphic processing on the basis of the graphic element lists, and an arbitrator. The graphic processor includes two buffers for storing graphic contexts corresponding to the graphic element lists together with identification information on the graphic contexts, and a unit for reading a specific graphic context from the buffers upon inputting the graphic element lists from the arbitrator to conduct the graphic processing. Each of the vector processors produces the graphic element lists having, as their contents, the identification information of the graphic context specified by the geometry processing assigned to each of the vector processors.

18 Claims, 6 Drawing Sheets

OTHER PUBLICATIONS

David A. Ellsworth, "A New Algorithm For Interactive Graphics on Multicomputers," IEEE Computer Graphics and Applications, vol. 14, No. 4, Jul. 1994, pp. 33-40.

Steven Molnar, Michael Cox, David Ellsworth and Henry Fuchs, "A Sorting Classification of Parallel Rendering," IEEE Computer Graphics and Applications, vol. 14, No. 4, Jul. 1994, pp. 23-32.

Larry J. Thayer, "Custom VLSI in the 3D Graphics Pipeline," Hewlett-Packard Journal, vol. 40, No. 6, Dec. 1989.

Dick Pountain, "PixelFlow: Scalable Image Processing," BYTE, McGraw-Hill, vol. 20, No. 11, Nov. 1995.

* cited by examiner

IMAGE PRODUCING DEVICE

BACKGROUND OF THE INVENTION

1. Field of the Invention

The present invention relates to an image producing device utilized in computer graphics.

2. Description of the Related Art

In the computer graphics, an object to be displayed is made into a model by an assembly of a plurality of polygons. The respective vertexes of the polygons are represented by the columns of coordinates (x, y, z, w). The respective vertexes are coordinates-converted in accordance with a visual point position and then subjected to through-vision conversion in accordance with distances. In other words, the conversions are conducted in such a manner that a position far from a certain visual point is viewed to be small. The above sequential processing is called "geometry processing". The vertex coordinates columns of each the polygon are obtained through the geometry processing. The vertex coordinates columns are transmitted to a graphic processing means as a display list (a graphic element list).

The graphic processing means draws a basic graphic in a frame memory in accordance with the display list. The drawing result is converted into an analog signal from a digital signal and then displayed on a display unit. Because the drawing result is updated every video rate, for example, every 1/60 seconds, a moving picture is displayed on a screen of the display unit. The above sequential graphic processing is called "rendering processing".

In recent years, the semiconductor technology is remarkably progressive, and it is possible to realize that the frame memory and the graphic processing means are mounted on one LSI together. The graphic processing means includes a large number of circuits which are disposed in parallel with each other, and the parallel arrangement of the large number of circuits is compatible with the rendering processing where simple processing is frequently repeated. Also, if a memory is mounted in an unoccupied area, the band width of the frame memory can be widened. For that reason, the performance of the graphic processing means, in particular, a pixel driving speed can be significantly improved as compared with the conventional art. On the other hand, the performance of the corresponding geometry processing becomes relatively short. In other words, even if more polygons can be drawn in the frame memory, a process of calculating the vertex coordinates of the respective polygons is delayed.

In order to solve the above problem, it is effective to dispose geometry engines that execute the geometry processing in parallel with the graphic processing means. However, in drawing the graphic, because there are a large number of graphic contexts which are parameters to be predetermined, for example, a large number of clip regions, a large number of semi-transparent processing rates and so on, and parameters used in the individual geometry engines are different from each other, it is necessary to change over an input of the graphic processing means for each of the geometry engines. However, if the graphic contexts are changed over every times, an overhead at an input stage of the drawing means is too large. In addition, the change-over of the graphic context disturbs the coherence (consistency) of a cash memory and remarkably deteriorates the hit rate of the cash.

SUMMARY OF THE INVENTION

The present invention has been made under the above circumstances, and therefore an object of the present invention is to provide an image producing device which is capable of eliminating the above problem.

In order to solve the above problem, according to the present invention, there is provided an image producing device comprising: a plurality of geometry processing means for conducting geometry processing for expressing respective images in parallel to produce graphic element lists; graphic processing means for conducting graphic processing on the basis of the graphic element lists; and an arbitrator for arbitrating the graphic element lists produced by the plurality of geometry processing means to lead the graphic element lists to the graphic processing means; wherein the graphic processing means includes a buffer for storing graphic contexts corresponding to the graphic element lists together with identification information on the graphic contexts, and means for reading a specific graphic context from the buffer upon inputting the graphic element lists from the arbitrator to conduct the graphic processing; and wherein each of the plurality of geometry processing means produces the graphic element list having, as its contents, the identification information of the graphic context specified by the geometry processing assigned to each of the geometry processing means.

In the present specification, the graphic context is directed to polygon definition information, that is, graphic region setting information and polygon information, for example, in the case where a graphic is formed by polygons. The graphic region setting information is directed to the offset coordinates of the graphic region and the coordinates of a drawing clipping region for canceling the drawing in the case where the coordinates of the polygon exist in the exterior of the graphic region. The polygon information is normally made up of polygon attribute information and vertex information. The polygon attribute information is directed to information that designates a shading mode, an α-blending mode, a texture mapping mode and so on which have been well known. The vertex information is directed to information on vertex drawing in-region coordinates, vertex texture in-region coordinates, a vertex color and so on. The above information includes a large amount of data, and therefore overhead is caused by frequently changing over the above information at a forestage of the rendering processing means. Under the above circumstances, in the present invention, the graphic context per se is held at the graphic processing means side, and the rendering processing means designates an appropriate graphic context on the basis of the identification information of the graphic context. The graphic processing means reads the designated graphic context and subjects the graphic context thus designated to the graphic processing. With the above operation, the overhead occurring when the geometry processing is conducted in parallel is reduced.

In a preferred embodiment, the graphic context of a kind different in each of the plurality of geometry processing means is stored in the buffer. Also, each of the plurality of geometry processing means is so designed as to produce the graphic element list including information representative of the priority of graphics, and the arbitrator is so designed as to guide the graphic element list higher in priority to the graphic processing means when a plurality of graphic element lists compete with each other. In the case where the change-over of the graphic context is intended to be inhibited for only a certain time zone, the arbitrator is so designed as to block the graphic element list from another geometry processing means while a specific code is set in a specific field of the graphic element list sent from a certain geometry processing means in a time-series manner.

In the case where an image processing is more effectively conducted, at least one of the plurality of geometry processing means is comprised of a processor that conducts a formulaic geometry processing, and at least another geometry processing means is comprised of a processor that is tightly coupled with another processor so as to conduct an informulaic geometry processing in cooperation with the foregoing another processor.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMETNS

Now, a description will be given in more detail of a preferred embodiment where an image producing device according to the present invention is applied to an entertainment device that produces a computer graphic image for entertainment with reference to the accompanying drawings.

An entertainment device according to this embodiment is so designed as to express a moving picture by polygons on a display unit and to output a sound corresponding to the motion of the picture from a speaker in accordance with program or data recorded on an interchangeable media such as a CD-ROM or a DVD-ROM.

Figure 1:
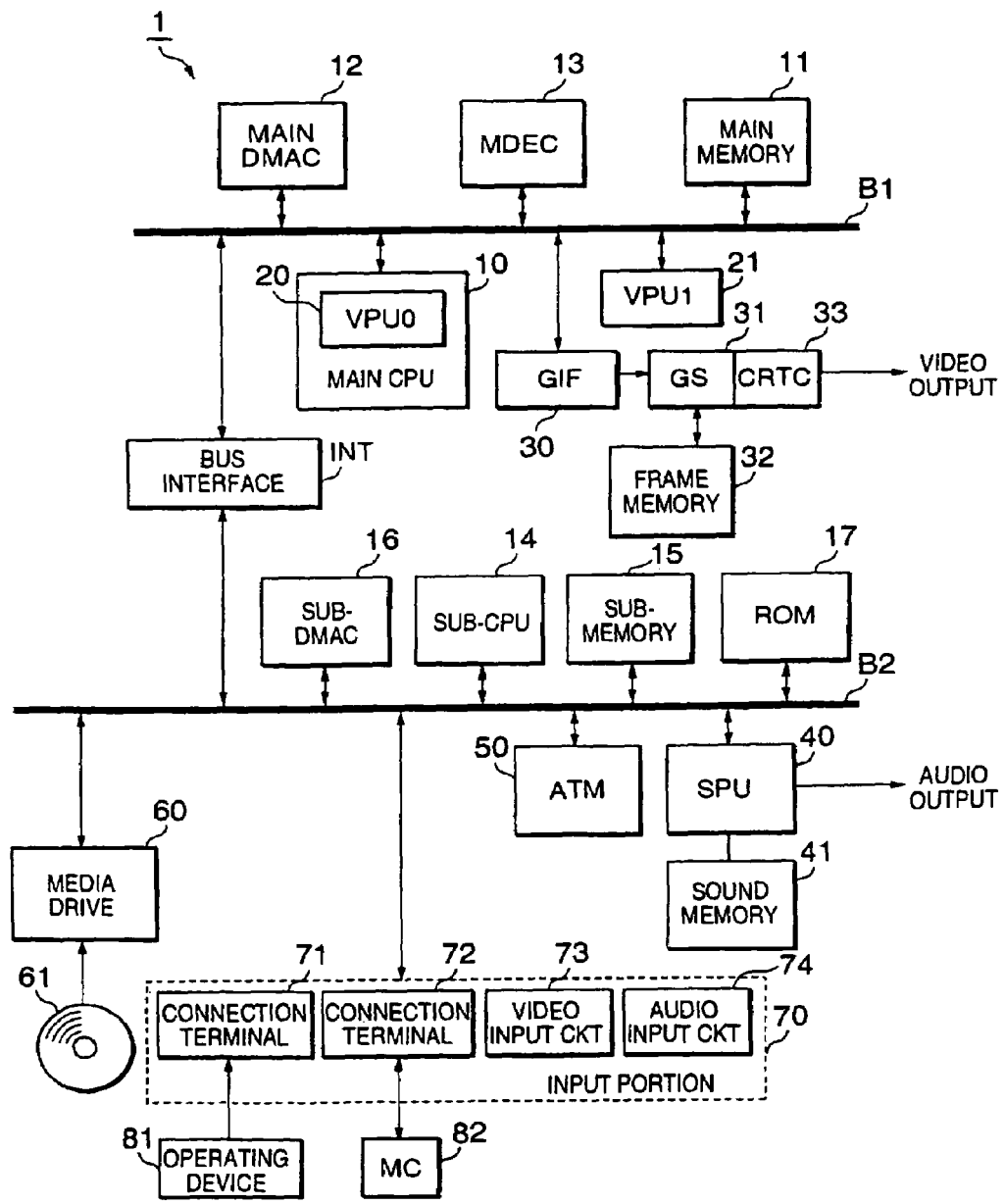
FIG. 1 is a diagram showing an internal structure of an entertainment device in accordance with an embodiment of the present invention.

FIG. 1 is a diagram showing an internal structure of the entertainment device. The entertainment device 1 has two buses consisting of a main bus B1 and a sub-bus B2, and those buses B1 and B2 are connected to or disconnected from each other through a bus interface INT.

The main bus B1 is connected with a main CPU (central processing unit) 10 made up of a microprocessor, a first vector processing unit (VPU (vector processing unit) 0, hereinafter referred to as "first VPU") 20, and so on; a main memory 11 made up of a RAM (random access memory); a main DMAC (direct memory access controller) 12; an MPEG (moving picture experts group) decoder (MDEC) 13; a second vector processing unit (VPU 1, hereinafter referred to as "second VPU") 21; and a GIF (graphical synthesizer interface) 30 that functions as an arbitrator of the first VPU 20 and the second VPU 21. In addition, the main bus B1 is connected with a graphic processing means (graphical synthesizer, hereinafter referred to as "GS") 31 through a GSIF 30. The GS 31 is connected with a CRTC (CRT controller) 33 that produces a video output signal.

The main CPU 10 reads a start program from a ROM 17 on the sub-bus B2 through the bus interface INT and executes the start program to operate an operating system when the entertainment device 1 starts. The main CPU 10 also controls a media drive 60 so as to read application program or data from a media 61, and allows the application program or the data to be stored in the main memory 11. In addition, the main CPU 10 conducts geometry processing on various data read from the media 61, for example, three-dimensional object data (the coordinates of the vertexes (representative points) of a polygon, etc.) made up of a plurality of basic graphics (polygons) in cooperation with the first VPU 20 to produce a display list.

Within the main CPU 10 is disposed a high-speed memory which is called "SPR (scratch pad RAM)" for temporarily storing the results of the geometry processing conducted in cooperation with the first VPU 20.

The second VPU 21 conducts geometry processing while the first VPU 20 conducts the geometry processing, to produce a display list. The display lists produced by the first VPU 20 and the second VPU 21 are transferred to the GS 31 through the GIF 30. The GS 31 conducts the rendering processing on the basis of the display lists. The GIF 30 basically conducts arbitration so that the display lists produced by the first VPU 20 and the second VPU 21 do not collide with each other when those display lists are transferred to the GS 31. In this embodiment, a function of arranging those display lists in the order of the higher priority and transferring the more superior display lists to the GS 31 in order is added to the GIF 30. The information representative of the priority of the display lists is normally described in a tag region when the respective VPUs 20 and 21 produce the display lists. Alternatively, the priority of the display lists may be originally judged by the GIF 30.

The first VPU 20, the second VPU 21 and the GS 31 will be described in more detail later.

The main DMAC 12 conducts a DMA transfer control on the respective circuits connected to the main bus B1, and conducts the DMA transfer control on the respective circuits connected to the sub-bus B2 in accordance with a state of the bus interface INT.

The MDEC 13 operates in parallel with the main CPU 10 and expands data compressed through an MPEG (moving picture experts group) system, a JPEG (joint photographic experts group) system or the like.

On the other hand, the sub-bus B2 is connected with the sub-CPU 14 made up of a microprocessor and so on; a sub-memory 15 made up of a RAM; a sub-DMAC 16; the ROM 17 in which program such as an operating system is stored; a sound processing unit (SPU) 40 that reads sound data stored in a sound memory 41 and outputs the sound data as an audio output; a communication control unit (ATM) 50 that conducts the transmit/receive of data through a public line or the like; the media drive 60 for installing the media 61 such as a CD-ROM or a DVD-ROM; and an input portion 70. The input portion 70 includes a connection terminal 71 for connecting an operating device 81, a connection terminal 72 for connecting a memory card MC, a video input circuit 73 for inputting image data from the external, and an audio input circuit 74 for inputting audio data from the external.

The sub-CPU 14 conducts various operations in accordance with the program stored in the ROM 17. The sub- DMAC 16 controls the DMA transfer and so on with respect to the respective circuits connected to the sub-bus B2 only in a state where the bus-interface INT disconnects the main bus B1 and the sub-bus B2.

Subsequently, a description will be given in more detail of the featured geometry processing in the entertainment device 1 structured as described above.

As described above, in this embodiment, the first VPU 20 and the second VPU 21 operate at the same time, thereby being capable of conducting the geometry processing which can be adapted to high-speed rendering processing.

The first VPU 20 includes a plurality of operational elements that arithmetically operate a real number of a floating point, and conducts floating pint arithmetic by those operational elements at the same time where the second VPU 21 operates. In this embodiment, the microprocessor in the main CPU 10 and the first VPU 20 are tightly coupled to each other, to thereby conduct arithmetic processing that requires fine operation by a polygon unit among the geometry processing in cooperation with each other. Then, the first VPU 20 produces a display list having polygon definition information such as a vertex coordinates column or shading mode information which is obtained through the above arithmetic processing as its contents.

The polygon definition information essentially consists of graphic region setting information and polygon information. The contents of the graphic region setting information and the polygon information are described above.

The second VPU 21 operates in the same manner as the first VPU 20, that is, includes a plurality of operational elements that arithmetically operate a real number of a floating point and conducts floating point arithmetic by those operational elements, independently, while the first VPU 20 operates. Then, the second VPU 21 produces a display list having, as its contents, what can produce an image due to the operation of the operating device 81 and the operation of a matrix, for example, a relatively simple two-dimensional polygon definition information which can be produced through processing such as through-vision conversion with respect to an object having a simple configuration such as a building or a vehicle, parallel light source calculation, or two-dimensional curved surface generation.

Figure 2:
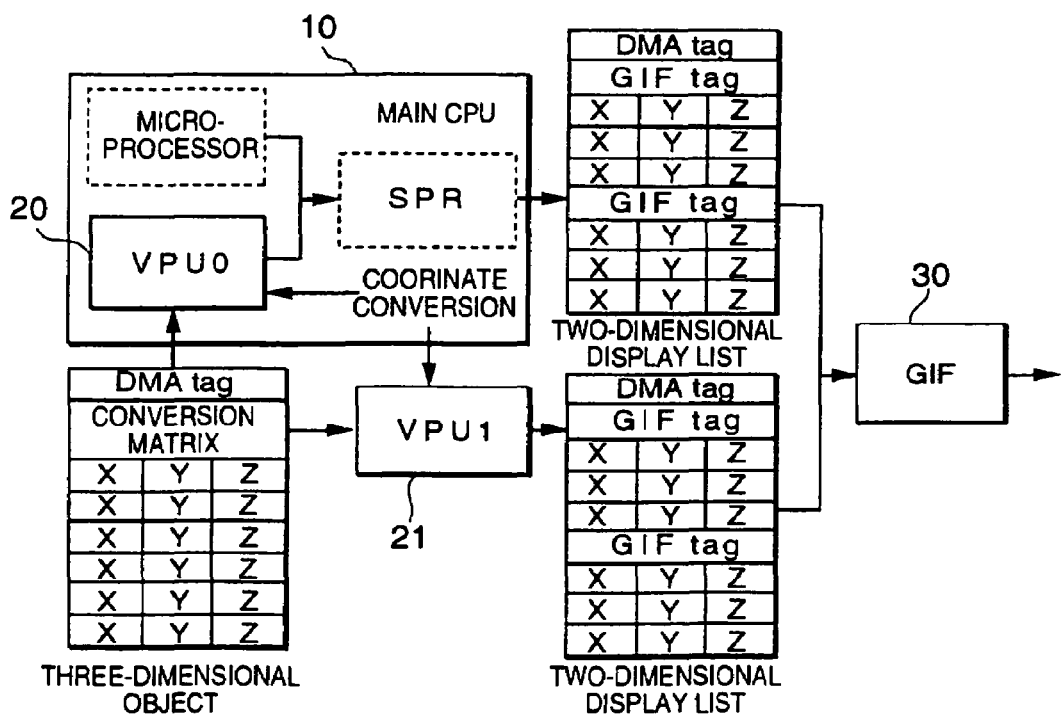
FIG. 2 is a conceptually explanatory diagram showing geometry processing in accordance with this embodiment.

FIG. 2 shows a process of producing display lists by the first VPU 20 and the second VPU 21.

That is, a three-dimensional object (coordinates columns of X, Y and Z) identified by "DMA tag" is coordinate-converted by the respective VPUs 20 and 21, respectively, to thereby produce two-dimensional display lists identified by "DMA tag" and "GIF tag". Those display lists are merged and sent to the GIF 30.

Although the first VPU 20 and the second VPU 21 are identical in structure, they function as geometry engines that take charge of the arithmetic processing which is different in contents, respectively.

Normally, the processing of the motion of a character or the like which requires complicated movement calculation (informulaic geometry processing) is assigned to the first VPU 20, and an object that requires a large number of polygons which are simple, for example, the processing of a background building or the like (formulaic geometry processing) is assigned to the second VPU 21.

Also, the first VPU 20 conducts a macro-arithmetic processing which synchronizes with a video rate, and the second VPU 21 is so set as to operate in synchronism with the GS 31. For that reason, the second VPU 21 includes a direct path which is connected directly to the GS 31. Conversely, the first VPU 20 is so designed as to readily conduct the programming of a complicated processing. This is a reason that the first VPU 20 is tightly coupled to the microprocessor of the main CPU 10.

Figure 3:
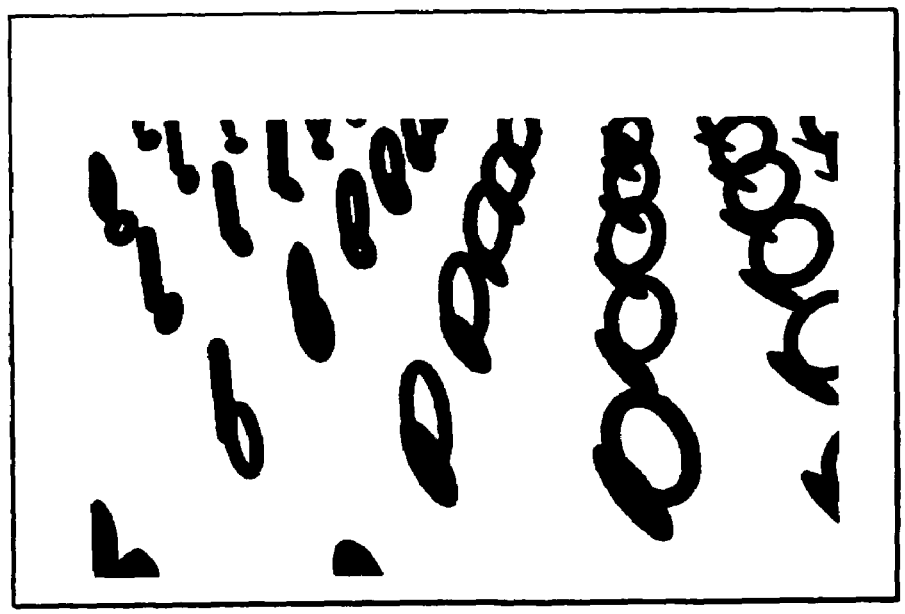
FIG. 3 is a diagram showing an example of an image produced through arithmetic processing conducted by a second VPU.
Figure 4:
FIG. 4 is a diagram showing an example that an image produced asynchronously by a first VPU is superimposed on an image shown in FIG. 3 while a second VPU threads its way through a bus for a GS.

FIG. 3 shows an image produced through the arithmetic processing made by the second VPU 21, and FIG. 4 shows that the second VPU 21 superimposes images produced asynchronously by the first VPU 20 while threading their ways through a bus for the GS 31.

The reason that a required task and process can be determined by those two VPUs 20 and 21 as in this embodiment is because the intended use of this device is specialized to entertainment multi-media. If it is a general-purpose device, there is a fear that the retreat of various registers or the disturbance of a floating point arithmetic pipeline occurs.

Subsequently, the GIF 30 and the GS 31 which are other features of the entertainment device 1 will be described in more detail.

The GIF 30 includes a function of transferring the display lists to the GS 31 in the order of the higher priority as described above.

Figure 5:
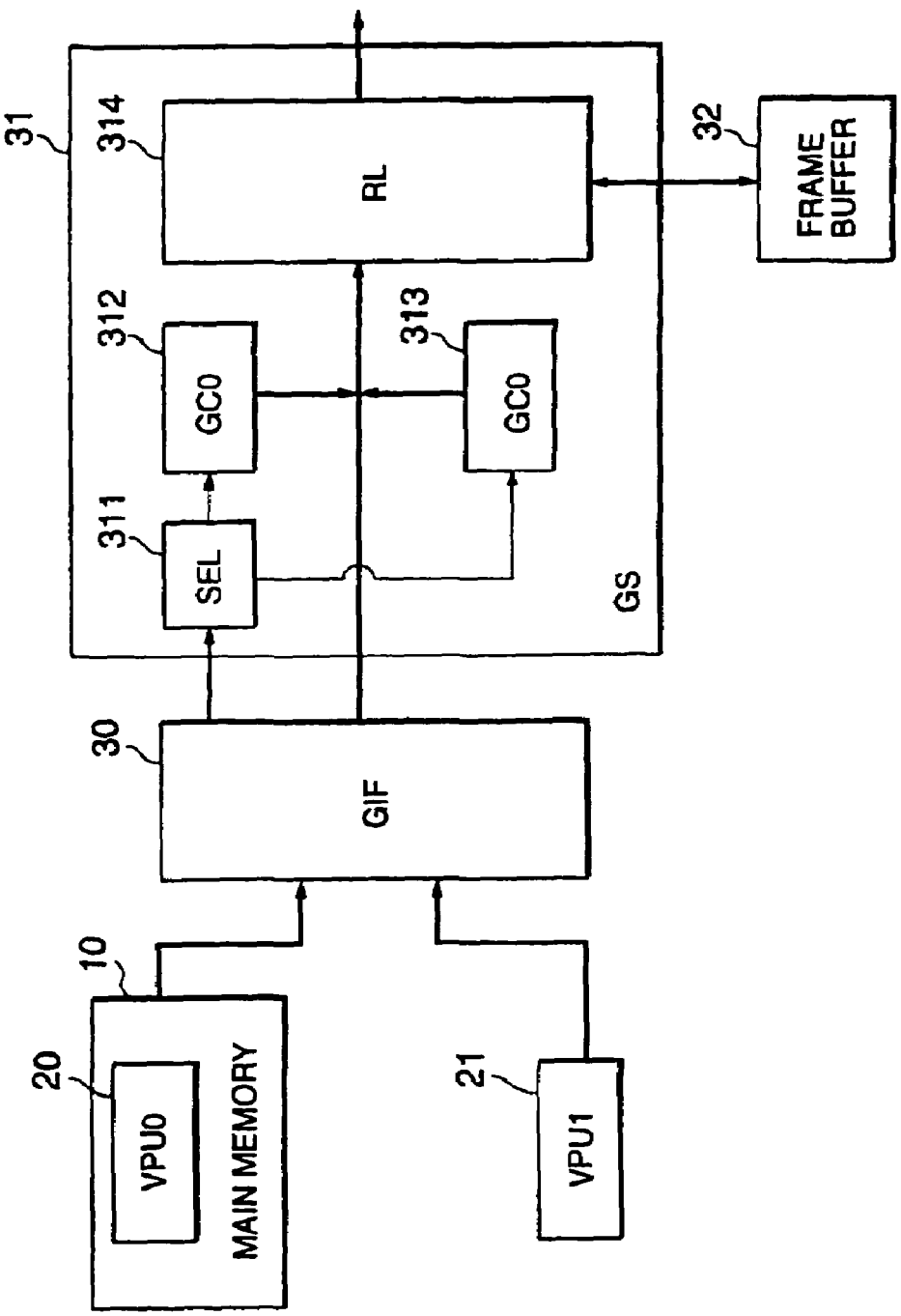
FIG. 5 is a diagram showing the structure of the GS and a connection state of its peripheral elements.

The GS 31 includes a context selector 311, a pair of graphic context buffers 312 and 313, and a rendering processing mechanism (rendering logic, "RL") 314 as shown in FIG. 5. The RL 314 per se is well known.

The first graphic context buffer (GC0, hereinafter referred to as "first GC") 312 stores the individual graphic contexts which are plural pairs of parameter sets for the first VPU 20 together with their identification information, and the second graphic context buffer (GC 1, hereinafter referred to as "second GC") 313 stores the individual graphic contexts which are plural pairs of parameter sets for the second VPU 21 together with their identification information. Which graphic contexts should be held at the GC 312 or 313 side can be arbitrarily set in accordance with a purpose of the entertainment.

The context selector 311 outputs an appropriate graphic context to the first GC 312 or the second GC 313 on the basis of a context ID (GC0/GC1) and the identification information which are announced from the GIF 30.

The RL 314 conducts the rendering processing with the use of the graphic context and the display list and draws a polygon in a frame buffer or memory 32. Because the frame memory 32 can be also employed as a texture memory, the frame memory 32 can be stuck on the drawn polygon with a pixel image on the frame memory as a texture.

As described above, since the GS 31 stores the graphic contexts in the first GC 312 and the second GC 313 therein in advance, the contents of the display lists are sufficient if which graphic contexts to be used are designated with the results that not only the length of the display list per se is shortened, but also the overhead at the input stage of the RL 314 can be remarkably reduced. For that reason, the overall image processing of from the geometry processing to the rendering processing is made high in efficiency and high in performance.

Also, since which graphic context stored in any one of the first GC 312 and the second GC 313 to be used is arbitrarily selected by describing the context ID and the identification information in the display list, if how to identify the context which is used by the first VPU 20 and the second VPU 21 is promised in advance, the different display lists from the respective VPUs 20 and 21 can be merged by the GIF 30 as shown in FIG. 5, which is very useful.

Although the overhead when the graphic context is changed over is reduced as described above, there is a case in which the change-over of the graphic context is intended to be absolutely inhibited, for example, as in a case where any one of the respective VPUs 20 and 21 uses the common region of the frame memory 32 as a primary region.

For this case, a mode for absolutely inhibiting the change-over of the graphic context is provided in the GIF 30. Specifically, while a specific code (for example, a mark such as "EOP") is set in a specific field of the display list sent from one VPU in a time-series manner (for example, a region subsequent to a GIFtag in the display list shown in FIG. 2), a display list from another VPU is blocked.

The above-described example will be described with a specific example.

Figure 6:
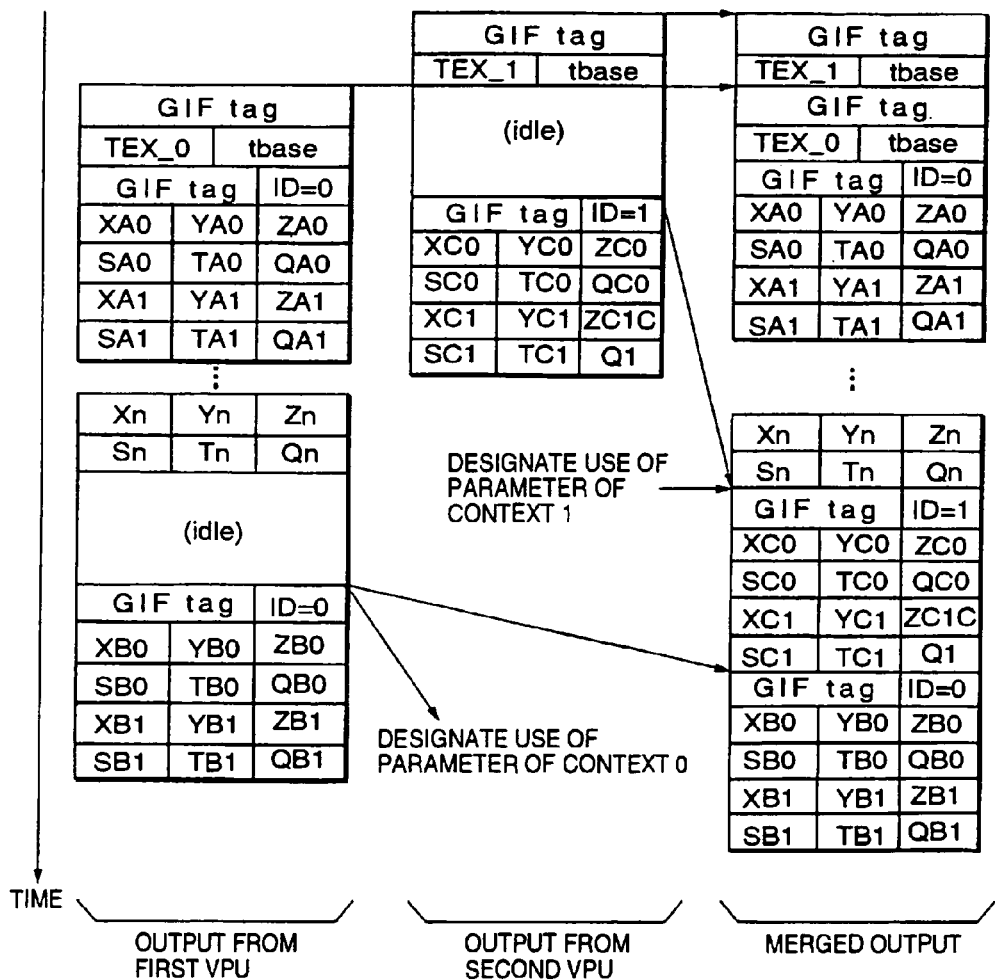
FIG. 6 is a diagram showing an example of how to designate graphic contexts in display lists.
Figure 7:
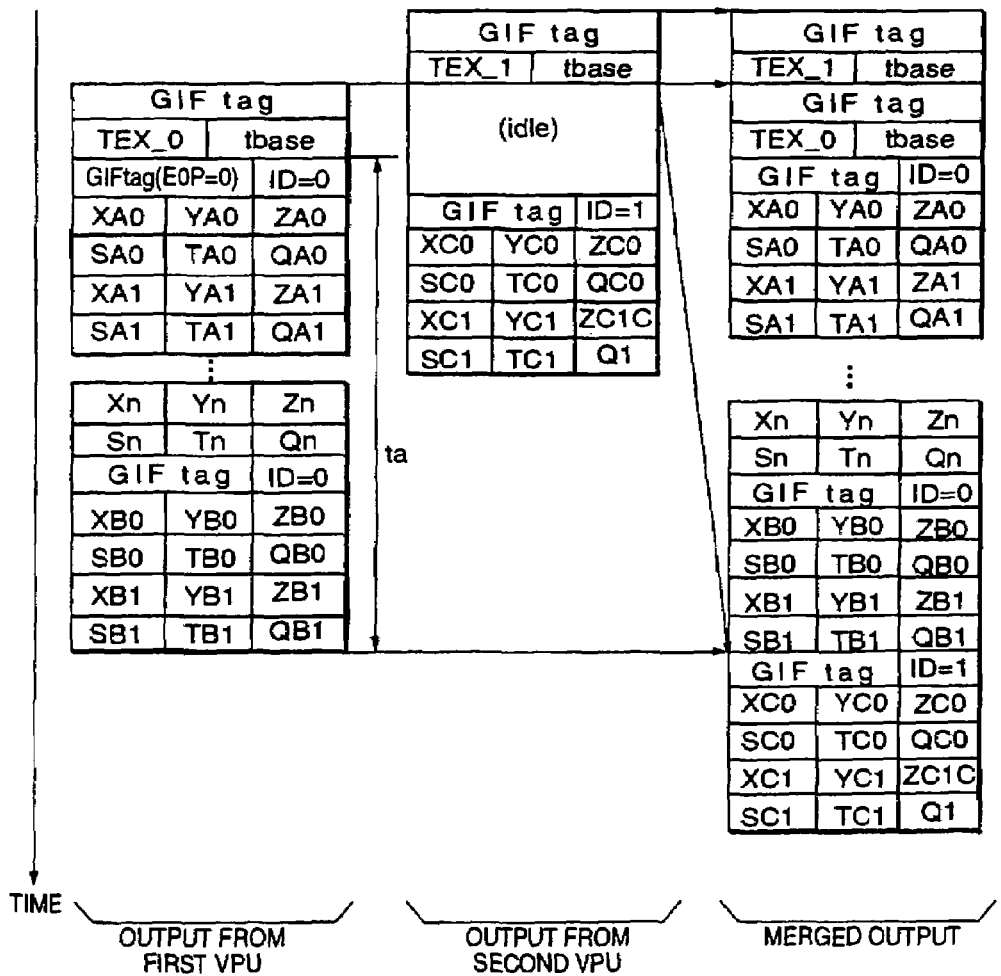
FIG. 7 is a diagram showing that a display list outputted from a first VPU precedes other display lists when the display lists are merged, at a time ta.

FIGS. 6 and 7 are diagrams showing examples of how to designate the graphic contexts in the display lists produced by the respective VPUs 20 and 21, respectively. In the respective figures, the left side shows a display list outputted from the first VPU 20, the center shows a display list outputted from the second VPU 21 and the right side shows a display list merged by the GIF 30. The axis of ordinate represents a time.

FIG. 6 shows an example that designates the use of a parameter identified by "XBO" or the like among the graphic contexts of the context 0 (ID indicating that the graphic context is stored in the first GC 312) in the first VPU 20, and the use of a parameter identified by "XCO" or the like among the graphic contexts of the context 1 (ID indicating that the graphic context is stored in the second GC 313) in the second VPU 21. The display lists are sequentially merged along the time-series, and as shown in the figure, it is readily identified that the display list is produced from any one of those first and second VPUs 20 and 21 by the GIFtag and the context ID. The "idol" represents a standby state.

FIG. 7 shows that a display list outputted from the first VPU 20 precedes other display lists when the display list is merged by the GIF 30, at a certain time ta, by describing "EOP" in the region of GIFtag. During the above operation, the graphic context for the first VPU 20 is transferred to the RL 314 without being interrupted from the second VPU 21.

As described above, in the entertainment device 1 according to this embodiment, since the first VPU 20 and the second VPU 21 which execute the geometry processing are disposed in parallel with the GS 31, the graphic contexts used in the respective VPUs 20 and 21 are provided at the GS side, and the contents of the display lists are only information for identifying the graphic context to be used, the high efficiency of the geometry processing and a reduction in the load occurring when the context at the input stage of the GS 31 is changed over can be performed at the same time.

This embodiment shows an example in which two VPUs 20 and 21 are employed as the geometry engines. However, it is needless to say that the number of VPUs may be three or more, and another arithmetic processing means having a function equivalent to the VPU may be used. Also, the image producing device according to the present invention is not limited by or to the entertainment device 1, but can be applied to image producing mechanisms of the same type likewise. In other words, an image to be drawn may not always be a computer graphics image for the entertainment, and the image contexts are not also limited to or by those in this embodiment.

As was apparent from the above description, the present invention can provide the inherent advantages that the overhead at a forestage of the rendering processing when the geometry processing is conducted at the same time can be suppressed.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image producing device, comprising:
   a plurality of geometry processing means for conducting geometry processing on respective images in parallel and to produce graphic element lists;
   graphics processing means for conducting graphic processing based on said graphic element lists; and
   an arbitrator for controlling delivery of said graphic element lists produced by said plurality of geometry processing means to said graphics processing means, wherein:
   said graphics processing means includes a plurality of buffers for storing graphic contexts corresponding to said plurality of geometry processing means together with identification information thereof, and means for reading a specific graphic context from one of said plurality of buffers upon inputting said graphic element lists from said arbitrator to conduct said graphic processing, and
   each of said plurality of geometry processing means produces said graphic element list having, as its contents, said identification information of said graphic context and information for specifying one of said plurality of buffers, and said reading means reads a corresponding graphic context according to said identification information of said corresponding graphic context and said information for specifying said one of said plurality of buffers.

2. The image producing device as claimed in claim 1, wherein said graphic context of a kind different in each of said plurality of geometry processing means is stored in said buffer.

3. The image producing device as claimed in claim 1, wherein:
   each of said plurality of geometry processing means produces said graphic element list including information representative of a priority of said graphic element list; and
   said arbitrator guides said graphic element list higher in priority to said graphic processing means when a plurality of graphic element lists compete with each other.

4. The image producing device as claimed in claim 1, wherein said arbitrator blocks said graphic element list from another geometry processing means while a specific code is set in a specific field of said graphic element list sent from a certain geometry processing means in a time-series manner.

5. The image producing device as claimed in claim 1, wherein at least one of said plurality of geometry processing means comprises a processor that conducts formulaic geometry processing, and at least another geometry processing means comprises a processor that is tightly coupled with another processor so as to conduct informulaic geometry processing in cooperation with said another processor.

6. The image producing device as claimed in claim 1, wherein an image to be drawn comprises a computer graphic image for entertainment.

7. The image producing device as claimed in claim 1, wherein a first one of said plurality of geometry processing means comprises a first processor that conducts geometry processing independently, and a second one of said plurality of geometry processing means comprises a second processor that conducts geometry processing in cooperation with said first processor.

8. An apparatus, comprising:
a plurality of geometry processing units, each being operable to perform one or more geometry processes on respective images to produce graphic element lists, where each graphic element list includes an identifier of one of a plurality of graphic contexts in which said graphic element list is to be rendered;
a graphics processing unit operable to render said graphic element lists into a frame buffer, said graphics processing unit including a plurality of buffers and a reading unit, each buffer being operable to store at least one of said plurality of graphic contexts corresponding to a respective one of said geometry processing units together with said identifier; and
an arbitration unit coupled to said plurality of geometry processing units and operable to control a sequence in which said graphic element lists are delivered to said graphics processing unit for rendering;
wherein each said graphic element list also includes information for specifying one of said plurality of buffers, and the reading unit is operable to retrieve said graphic contexts from said plurality of buffers specified by said identifiers and said information for specifying said one of said plurality of buffers in said graphic element lists such that said graphics processing unit renders said graphic element lists in accordance with said graphic contexts.

9. The apparatus as claimed in claim 8, wherein said plurality of buffers include different graphic contexts for each of said plurality of geometry processing units.

10. The apparatus as claimed in claim 7, wherein said reading unit is further operable to select use of graphic contexts from respective ones of said buffers based on said identifiers in said graphic element lists.

11. The apparatus as claimed in claim 7, wherein said arbitration unit is further operable to block graphic element lists from a given one of said geometry processing units in response to a code included in a graphic element list of another of said geometry processing units.

12. The apparatus as claimed in claim 7, wherein said arbitration unit is further operable to control said sequence in which said graphic element lists are delivered to said graphics processing unit based on respective priorities between graphic element lists.

13. The apparatus as claimed in claim 12, wherein each of said plurality of geometry processing units are operable to insert priority data in said graphic element lists.

14. The apparatus as claimed in claim 13, wherein:
at least one of said plurality of geometry processing units is operable to produce graphic element lists in accordance with formulaic geometry processing;
at least one of said geometry processing units is operable to produce graphic element lists in accordance with informulaic geometry processing; and
said graphic element lists produced in accordance with informulaic geometry processing include higher priority than said graphic element lists produced in accordance with formulaic geometry processing.

15. The apparatus as claimed in claim 7, wherein:
at least one of said plurality of geometry processing units is operable to produce graphic element lists in accordance with formulaic geometry processing;
at least one of said geometry processing units is operable to produce graphic element lists in accordance with informulaic geometry processing; and
said graphic element lists produced in accordance with informulaic geometry processing include higher priority than said graphic element lists produced in accordance with formulaic geometry processing.

16. A method, comprising:
performing one or more geometry processes on respective images to produce graphic element lists;
assigning an identifier to each graphic element list that includes an indication of one of a plurality of graphic contexts in which each said graphic element list is to be rendered, each identifier being assigned to a respective geometry processing means;
storing each of said plurality of graphic contexts in one of a plurality of buffers together with a respective one of said identifiers;
assigning information to each graphic element list for specifying one of said plurality of buffers;
retrieving graphic contexts from said buffers specified by said identifiers and said specifying information in said graphic element lists; and
rendering said graphic element lists into a frame buffer in accordance with said specified graphic contexts.

17. The method of claim 16, further comprising controlling a sequence in which said graphic element lists are rendered in accordance with respective priorities thereof.

18. The method as claimed in claim 16, further comprising blocking some graphic element lists in response to a code included in another graphic element list.

* * * * *

UNITED STATES PATENT AND TRADEMARK OFFICE
CERTIFICATE OF CORRECTION

PATENT NO.        : 7,079,146 B2                                     Page 1 of 6
APPLICATION NO. : 09/797514
DATED             : July 18, 2006
INVENTOR(S)       : Tanaka et al.

It is certified that error appears in the above-identified patent and that said Letters Patent is hereby corrected as shown below:

Please delete column 1 line 1 through column 10 line 52 and insert column 1 line 1 through column 10 line 50 as attached Signed and Sealed this Tenth Day of June, 2008

JON W. DUDAS
*Director of the United States Patent and Trademark Office*

IMAGE PRODUCING DEVICE

BACKGROUND OF THE INVENTION

The present invention relates to an image producing device utilized in computer graphics.

In computer graphics, an object to be displayed is made into a model by an assembly of a plurality of polygons. The respective vertexes of the polygons are represented by columns of coordinates (x, y, z, w). The respective vertexes are coordinates that are converted in accordance with a visual point position and then subjected to through-vision conversion in accordance with distances. In other words, the conversions are conducted in such a manner that a position far from a certain visual point is viewed to be small. The above sequential processing is called "geometry processing". The columns of vertex coordinates of each the polygons are obtained through the geometry processing. The columns of vertex coordinates are transmitted to a graphic processing means as a display list (a graphic element list).

The graphic processing means draws a basic graphic in a frame memory in accordance with the display list. The drawing result is converted into an analog signal from a digital signal and then displayed on a display unit. Because the drawing result is updated every video rate, for example, every 1/60 seconds, a moving picture is displayed on a screen of the display unit. The above sequential graphic processing is called "rendering processing".

In recent years, the semiconductor technology has been remarkably progressive, and it is now possible to realize that the frame memory and the graphic processing means are mounted together on one LSI. The graphic processing means includes a large number of circuits which are disposed in parallel with each other, and the parallel arrangement of the large number of circuits is compatible with the rendering processing where simple processing is repeated frequently. Also, if a memory is mounted in an unoccupied area, the band width of the frame memory can be widened. For that reason, the performance of the graphic processing means, in particular, a pixel driving speed, can be significantly improved as compared with the conventional art. On the other hand, the performance of the corresponding geometry processing becomes relatively short. In other words, even if more polygons can be drawn in the frame memory, a process of calculating the vertex coordinates of the respective polygons is delayed.

In order to solve the above problem, it is effective to dispose geometry engines that execute the geometry processing in parallel with the graphic processing means. In drawing the graphic, there are a large number of graphic contexts which are parameters to be predetermined, for example, a large number of clip regions, a large number of semi-transparent processing rates and so on. The parameters used in the individual geometry engines are different from each other. Thus, it is necessary to change over an input of the graphic processing means for each of the geometry engines. However, if the graphic contexts are changed over every time, an overhead at an input stage of the drawing means is too large. In addition, the change-over of the graphic context disturbs the coherence (consistency) of a cash memory and largely deteriorates the hit rate of the cash.

SUMMARY OF THE INVENTION

The present invention has been made under the above circumstances, and therefore an object of the present invention is to provide an image producing device which is capable of eliminating the above problem.

In order to solve the above problem, according to the present invention, there is provided an image producing device comprising: a plurality of geometry processing means for conducting geometry processing for expressing respective images in parallel to produce graphic element lists; graphic processing means for conducting graphic processing on the basis of the graphic element lists; and an arbitrator for arbitrating the graphic element lists produced by the plurality of geometry processing means to lead the graphic element lists to the graphic processing means; wherein the graphic processing means includes a buffer for storing graphic contexts corresponding to the graphic element lists together with identification information on the graphic contexts, and means for reading a specific graphic context from the buffer upon inputting the graphic element lists from the arbitrator to conduct the graphic processing; and wherein each of the plurality of geometry processing means produces the graphic element list having, as its contents, the identification information of the graphic context specified by the geometry processing assigned to each of the geometry processing means.

In the present specification, the graphic context directed to polygon definition information, that is, graphic region setting information and polygon information, for example, in the case where a graphic is formed by polygons. The graphic region setting information is directed to the offset coordinates of the graphic region and the coordinates of a drawing clipping region for canceling the drawing in the case where the coordinates of the polygon exist in the exterior of the graphic region. The polygon information is normally made up of polygon attribute information and vertex information. The polygon attribute information is directed to information that designates a shading mode, an α-blending mode, a texture mapping mode and so on which have been well known. The vertex information is directed to information on vertex drawing in-region coordinates, vertex texture in-region coordinates, a vertex color and so on. The above information includes a large amount of data, and therefore overhead is caused by frequently changing over the above information at a forestage of the rendering processing means. Under the above circumstances, in the present invention, the graphic context per se is held at the graphic processing means side, and the rendering processing means designates an appropriate graphic context on the basis of the identification information of the graphic context. The graphic processing means reads the designated graphic context and subjects the graphic context thus designated to the graphic processing. With the above operation, the overhead occurring when the geometry processing is conducted in parallel is reduced.

In a preferred embodiment, the graphic context of a kind different in each of the plurality of geometry processing means is stored in the buffer. Also, each of the plurality of geometry processing means is so designed as to produce the graphic element list including information representative of the priority of graphics, and the arbitrator is so designed as to guide the graphic element list higher in priority to the graphic processing means when a plurality of graphic element lists compete with each other. In the case where the change-over of the graphic context is intended to be inhibited for only a certain time zone, the arbitrator is so designed as to block the graphic element list from another geometry processing means while a specific code is set in a specific field of the graphic element list sent from a certain geometry processing means in a time-series manner.

In the case where image processing is more effectively conducted, at least one of the plurality of geometry processing means is comprised of a processor that conducts a formulaic geometry process, and at least another geometry processing means is comprised of a processor that is tightly coupled with another processor so as to conduct an informulaic geometry process in cooperation with the foregoing other processor.

BRIEF DESCRIPTION OF THE DRAWINGS

These and other objects and advantages of this invention will become more fully apparent from the following detailed description taken with the accompanying drawings in which:

FIG. 1 is a diagram showing an internal structure of an entertainment device in accordance with an embodiment of the present invention;

FIG. 2 is a conceptually explanatory diagram showing geometry processing in accordance with this embodiment;

FIG. 3 is a diagram showing an example of an image produced through arithmetic processing conducted by a second VPU;

FIG. 4 is a diagram showing an example that an image produced asynchronously by a first VPU is superimposed on an image shown in FIG. 3 while a second VPU threads its way through a bus for a GS;

FIG. 5 is a diagram showing the structure of the GS and a connection state of its peripheral elements;

FIG. 6 is a diagram showing an example of how to designate graphic contexts in display lists; and FIG. 7 is a diagram showing that a display list outputted from a first VPU precedes other display lists when the display lists are merged, at a time ta.

DETAILED DESCRIPTION OF THE PREFERRED EMBODIMENTS

A description will now be given in more detail of a preferred embodiment where an image producing device according to the present invention is applied to an entertainment device that produces a computer graphic image for entertainment with reference to the accompanying drawings.

An entertainment device according to this embodiment is so designed as to express a moving picture by polygons on a display unit and to output a sound corresponding to the motion of the picture from a speaker in accordance with program or data recorded on an interchangeable media such as a CD-ROM or a DVD-ROM.

FIG. 1 is a diagram showing an internal structure of the entertainment device. The entertainment device 1 has two buses consisting of a main bus B1 and a sub-bus B2, and those buses B1 and B2 are connected to or disconnected from each other through a bus interface INT.

The main bus B1 is connected with a main CPU (central processing unit) 10 made up of a microprocessor, a first vector processing unit (VPU (vector processing unit) 0, hereinafter referred to as "first VPU") 20, and so on; a main memory 11 made up of a RAM (random access memory); a main DMAC (direct memory access controller) 12; an MPEG (moving picture experts group) decoder (MDEC) 13; a second vector processing unit (VPU 1, hereinafter referred to as "second VPU") 21; and a GIF (graphical synthesizer interface) 30 that functions as an arbitrator of the first VPU 20 and the second VPU 21. In addition, the main bus B1 is connected with a graphic processing means (graphical synthesizer, hereinafter referred to as "GS") 31 through a GSIF 30. The GS 31 is connected with a CRTC (CRT controller) 33 that produces a video output signal.

The main CPU 10 reads a start program from a ROM 17 on the sub-bus B2 through the bus interface INT and executes the start program to operate an operating system when the entertainment device 1 starts. The main CPU 10 also controls a media drive 60 so as to read an application program or data from a media 61, and allows the application program or the data to be stored in the main memory 11. In addition, the main CPU 10 conducts geometry processing on various data read from the media 61, for example, three-dimensional object data (the coordinates of the vertexes (representative points) of a polygon, etc.) made up of a plurality of basic graphics (polygons) in cooperation with the first VPU 20 to produce a display list.

Within the main CPU 10 is disposed a high-speed memory which is called "SPR (scratch pad RAM)" for temporarily storing the results of the geometry processing conducted in cooperation with the first VPU 20.

The second VPU 21 conducts geometry processing while the first VPU 20 conducts the geometry processing, to produce a display list. The display lists produced by the first VPU 20 and the second VPU 21 are transferred to the GS 31 through the GIF 30. The GS 31 conducts the rendering processing on the basis of the display lists. The GIF 30 basically conducts arbitration so that the display lists produced by the first VPU 20 and the second VPU 21 do not collide with each other when those display lists are transferred to the GS 31. In this embodiment, a function of arranging those display lists in the order of the higher priority and transferring the more superior display lists to the GS 31 in order is added to the GIF 30. The information representative of the priority of the display lists is normally described in a tag region when the respective VPUs 20 and 21 produce the display lists. Alternatively, the priority of the display lists may be originally judged by the GIF 30.

The first VPU 20, the second vPU 21 and the GS 31 will be described in more detail later.

The main DMAC 12 conducts a DMA transfer control on the respective circuits connected to the main bus B1, and conducts the DMA transfer control on the respective circuits connected to the sub-bus B2 in accordance with a state of the bus interface INT.

The MDEC 13 operates in parallel with the main CPU 10 and expands data compressed through an MPEG (moving picture experts group) system, a JPEG (joint photographic experts group) system or the like.

On the other hand, the sub-bus B2 is connected with the sub-CPU 14 made up of a microprocessor and so on; a sub-memory 15 made up of a RAM; a sub-DMAC 16; the ROM 17 in which program such as an operating system is stored; a sound processing unit (SPU) 40 that reads sound data stored in a sound memory 41 and outputs the sound data as an audio output; a communication control unit (ATM) 50 that conducts the transmit/receive of data through a public line or the like; the media drive 60 for installing the media 61 such as a CD-ROM or a DVD-ROM; and an input portion 70. The input portion 70 includes a connection terminal 71 for connecting an operating device 81, a connection terminal 72 for connecting a memory card MC, a video input circuit 73 for receiving external image data, and an audio input circuit 74 for receiving external audio data.

The sub-CPU 14 conducts various operations in accordance with the program stored in the ROM 17. The sub-DMAC 16 controls the DMA transfer and so on with respect to the respective circuits connected to the sub-bus B2 only in a state where the bus-interface INT disconnects the main bus B1 and the sub-bus B2.

Subsequently, a description will be given in more detail of the featured geometry processing in the entertainment device 1 structured as described above.

As described above, in this embodiment, the first VPU 20 and the second VPU 21 operate at the same time, thereby being capable of conducting the geometry processing which can be adapted to high-speed rendering processing.

The first VPU 20 includes a plurality of operational elements that arithmetically operate real floating point numbers, and conducts floating point arithmetic by those operational elements at the same time that the second VPU 21 operates. In this embodiment, the microprocessor in the main CPU 10 and the first VPU 20 are tightly coupled to each other, to thereby conduct arithmetic processing that requires fine operation by a polygon unit among the geometry processing in cooperation with each other. Then, the first VPU 20 produces a display list having polygon definition information such as a column of vertex coordinates or shading mode information which is obtained through the above arithmetic processing.

The polygon definition information essentially consists of graphic region setting information and polygon information. The contents of the graphic region setting information and the polygon information are described above.

The second VPU 21 operates in the same manner as the first VPU 20, that is, includes a plurality of operational elements that arithmetically operate on real floating point numbers and conducts floating point arithmetic by those operational elements, independently, while the first VPU 20 operates. The second VPU 21 produces a display list having, as its contents, information to produce an image in response to the operation of the operating device 81 and the operation of a matrix. For example, the information may include relatively simple two-dimensional polygon definition information which can be produced through processing such as through-vision conversion with respect to an object having a simple configuration such as a building or a vehicle, parallel light source calculation, or two-dimensional curved surface generation. FIG. 2 shows a process of producing display lists by the first VPU 20 and the second VPU 21. A three-dimensional object (columns of coordinates of X, Y and Z) identified by "DNA tag" is coordinate-converted by the respective VPUs 20 and 21, respectively, to thereby produce two-dimensional display lists identified by "DMA tag" and "GIF tag". Those display lists are merged and sent to the GIF 30.

Although the first VPU 20 and the second VPU 21 are identical in structure, they function as geometry engines that take charge of the arithmetic processing which is different in contents, respectively. Normally, the processing of the motion of a character or the like which requires complicated movement calculation (informulaic geometry processing) is assigned to the first VPU 20, and an object that requires a large number of polygons which are simple, for example, the processing of a background building or the like (formulaic geometry processing) is assigned to the second VPU 21. Also, the first VPU 20 conducts a macro-arithmetic processing which synchronizes with a video rate, and the second VPU 21 is so set as to operate in synchronism with the GS 31. For that reason, the second VPU 21 includes a direct path which is connected directly to the GS 31. Conversely, the first VPU 20 is so designed as to readily conduct the programming of a complicated processing. This is a reason that the first VPU 20 is tightly coupled to the microprocessor of the main CPU 10.

FIG. 3 shows an image produced through the arithmetic processing made by the second VPU 21, and FIG. 4 shows that the second VPU 21 superimposes images produced asynchronously by the first VPU 20 while threading their way through a bus for the GS 31.

The reason that a required task and process can be determined by the two VPUs 20 and 21 as in this embodiment is because the intended use of this device is specialized to entertainment multi-media. If it is a general-purpose device, there is a fear that the retreat of various registers or the disturbance of a floating point arithmetic pipeline occurs.

The GIF 30 and the GS 31, which are other features of the entertainment device 1, will now be described in more detail. The GIF 30 includes a function of transferring the display lists to the GS 31 in the order of the higher priority as described above. The GS 31 includes a context selector 311, a pair of graphic context buffers 312 and 313, and a rendering processing mechanism (rendering logic, "RL") 314 as shown in FIG. 5. The RL 314 per se is well known.

The first graphic context buffer (GC0, hereinafter referred to as "first GC") 312 stores the individual graphic contexts which are plural pairs of parameter sets for the first VPU 20 together with their identification information. The second graphic context buffer (GC1, hereinafter referred to as "second GC") 313 stores the individual graphic contexts which are plural pairs of parameter sets for the second VPU 21 together with their identification information. Which graphic contexts should be held at the GC 312 or 313 side can be arbitrarily set in accordance with a purpose of the entertainment.

The context selector 311 outputs an appropriate graphic context to the first GC 312 or the second GC 313 on the basis of a context ID (GC0/GC1) and the identification information which are announced from the GIF 30.

The RL 314 conducts the rendering processing with the use of the graphic context and the display list and draws a polygon in a frame buffer or memory 32. Because the frame memory 32 can be also employed as a texture memory, the frame memory 32 can be stuck on the drawn polygon with a pixel image on the frame memory as a texture.

As described above, since the GS 31 stores the graphic contexts in the first GC 312 and the second GC 313 in advance, the contents of the display lists need only indicate which graphic contexts are to be used. Thus, the length of the display list per se is shortened, and the overhead at the input stage of the RL 314 can be remarkably reduced. For that reason, the overall image processing from the geometry processing to the rendering processing is highly efficient and fast.

Since a graphic context stored in any one of the first GC 312 and the second GC 313 is arbitrarily selected for use by describing the context ID and the identification information in the display list, the different display lists from the respective VPUs 20 and 21 can be merged by the GIF 30 as shown in FIG. 5 if how to identify the context which is used by the first VPU 20 and the second VPU 21 is promised in advance. This is very useful.

Although the overhead when the graphic context is changed over is reduced as described above, there is a case in which the change-over of the graphic context is intended to be absolutely inhibited, for example, as in a case where any one of the respective VPUs 20 and 21 uses the common region of the frame memory 32 as a primary region. For this case, a mode for absolutely inhibiting the change-over of the graphic context is provided in the GIF 30. Specifically, while a specific code (for example, a mark such as "EOP") is set in a specific field of the display list sent from one VPU in a time-series manner (for example, a region subsequent to a GIFtag in the display list shown in FIG. 2), a display list from another VPU is blocked.

The above will now be described with a specific example.

FIGS. 6 and 7 are diagrams showing examples of how to designate the graphic contexts in the display lists produced by the respective VPUs 20 and 21, respectively. In the respective figures, the left side shows a display list outputted from the first VPU 20, the center shows a display list outputted from the second VPU 21 and the right side shows a display list merged by the GIF 30. The axis of ordinate represents time.

FIG. 6 shows an example that designates the use of a parameter identified by "XBO" or the like among the graphic contexts of the context 0 (ID indicating that the graphic context is stored in the first GC 312) in the first VPU 20, and the use of a parameter identified by "XCO" or the like among the graphic contexts of the context 1 (ID indicating that the graphic context is stored in the second GC 313) in the second VPU 21. The display lists are sequentially merged along the time-series, and as shown in the figure, it is readily identified that the display list is produced from any one of those first and second VPUs 20 and 21 by the GIFtag and the context ID. The "idol" represents a standby state.

FIG. 7 shows that a display list outputted from the first VPU 20 precedes other display lists when the display list is merged by the GIF 30, at a certain time ta, by describing "EOP" in the region of GIFtag. During the above operation, the graphic context for the first VPU 20 is transferred to the RL 314 without being interrupted from the second VPU 21.

As described above, in the entertainment device 1 according to this embodiment, since the first VPU 20 and the second VPU 21 which execute the geometry processing are disposed in parallel with the GS 31, the graphic contexts used in the respective VPUs 20 and 21 are provided at the GS side, and the contents of the display lists are only information for identifying the graphic context to be used, the high efficiency of the geometry processing and a reduction in the load occurring when the context at the input stage of the GS 31 is changed over can be performed at the same time.

This embodiment shows an example in which two VPUs 20 and 21 are employed as the geometry engines. However, it is needless to say that the number of VPUs may be three or more, and another arithmetic processing means having a function equivalent to the VPU may be used. Also, the image producing device according to the present invention is not limited by or to the entertainment device 1, but can likewise be applied to image producing mechanisms of the same type. In other words, an image to be drawn may not always be a computer graphics image for entertainment, and the image contexts are not also limited to or by those in this embodiment.

As was apparent from the above description, the present invention can provide the inherent advantages that the overhead at a forestage of the rendering processing when the geometry processing is conducted at the same time can be suppressed.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image producing device, comprising:
  a plurality of geometry processing means for conducting geometry processing on respective images in parallel and to produce graphic element lists;
  graphics processing means for conducting graphic processing based on said graphic element lists; and
  an arbitrator for controlling delivery of said graphic element lists produced by said plurality of geometry processing means to said graphics processing means, wherein:
    said graphics processing means includes a plurality of buffers for storing graphic contexts corresponding to said plurality of geometry processing means together with identification information thereof, and means for reading a specific graphic context from one of said plurality of buffers upon inputting said graphic element lists from said arbitrator to conduct said graphic processing, and
    each of said plurality of geometry processing means produces said graphic element list having, as its contents, said identification information of said graphic context and information for specifying one of said plurality of buffers, and said reading means reads a corresponding graphic context according to said identification information of said corresponding graphic context and said information for specifying said one of said plurality of buffers.

2. The image producing device as claimed in claim 1, wherein said graphic context of a kind different in each of said plurality of geometry processing means is stored in said buffer.

3. The image producing device as claimed in claim 1, wherein:
  each of said plurality of geometry processing means produces said graphic element list including information representative of a priority of said graphic element list; and
  said arbitrator guides said graphic element list higher in priority to said graphic processing means when a plurality of graphic element lists compete with each other.

4. The image producing device as claimed in claim 1, wherein said arbitrator blocks said graphic element list from another geometry processing means while a specific code is set in a specific field of said graphic element list sent from a certain geometry processing means in a time-series manner.

5. The image producing device as claimed in claim 1, wherein at least one of said plurality of geometry processing means comprises a processor that conducts formulaic geometry processing, and at least another geometry processing means comprises a processor that is tightly coupled with another processor so as to conduct informulaic geometry processing in cooperation with said another processor.

6. The image producing device as claimed in claim 1, wherein an image to be drawn comprises a computer graphic image for entertainment.

7. The image producing device as claimed in claim 1, wherein a first one of said plurality of geometry processing means comprises a first processor that conducts geometry processing independently, and a second one of said plurality of geometry processing means comprises a second processor that conducts geometry processing in cooperation with said first processor.

8. An apparatus, comprising:
a plurality of geometry processing units, each being operable to perform one or more geometry processes on respective images to produce graphic element lists, where each graphic element list includes an identifier of one of a plurality of graphic contexts in which said graphic element list is to be rendered;
a graphics processing unit operable to render said graphic element lists into a frame buffer, said graphics processing unit including a plurality of buffers and a reading unit, each buffer being operable to store at least one of said plurality of graphic contexts corresponding to a respective one of said geometry processing units together with said identifier; and
an arbitration unit coupled to said plurality of geometry processing units and operable to control a sequence in which said graphic element lists are delivered to said graphics processing unit for rendering;
wherein each said graphic element list also includes information for specifying one of said plurality of buffers, and the reading unit is operable to retrieve said graphic contexts from said plurality of buffers specified by said identifiers and said information for specifying said one of said plurality of buffers in said graphic element lists such that said graphics processing unit renders said graphic element lists in accordance with said graphic contexts.

9. The apparatus as claimed in claim 8, wherein said plurality of buffers include different graphic contexts for each of said plurality of geometry processing units.

10. The apparatus as claimed in claim 8, wherein said reading unit is further operable to select use of graphic contexts from respective ones of said buffers based on said identifiers in said graphic element lists.

11. The apparatus as claimed in claim 8, wherein said arbitration unit is further operable to block graphic element lists from a given one of said geometry processing units in response to a code included in a graphic element list of another of said geometry processing units.

12. The apparatus as claimed in claim 8, wherein said arbitration unit is further operable to control said sequence in which said graphic element lists are delivered to said graphics processing unit based on respective priorities between graphic element lists.

13. The apparatus as claimed in claim 12, wherein each of said plurality of geometry processing units are operable to insert priority data in said graphic element lists.

14. The apparatus as claimed in claim 13, wherein:
at least one of said plurality of geometry processing units is operable to produce graphic element lists in accordance with formulaic geometry processing;
at least one of said geometry processing units is operable to produce graphic element lists in accordance with informulaic geometry processing; and
said graphic element lists produced in accordance with informulaic geometry processing include higher priority than said graphic element lists produced in accordance with formulaic geometry processing.

15. The apparatus as claimed in claim 8, wherein:
at least one of said plurality of geometry processing units is operable to produce graphic element lists in accordance with formulaic geometry processing;
at least one of said geometry processing units is operable to produce graphic element lists in accordance with informulaic geometry processing; and
said graphic element lists produced in accordance with informulaic geometry processing include higher priority than said graphic element lists produced in accordance with formulaic geometry processing.

16. A method, comprising:
performing one or more geometry processes on respective images to produce graphic element lists;
assigning an identifier to each graphic element list that includes an indication of one of a plurality of graphic contexts in which each said graphic element list is to be rendered, each identifier being assigned to a respective geometry processing means;
storing each of said plurality of graphic contexts in one of a plurality of buffers together with a respective one of said identifiers;
assigning information to each graphic element list for specifying one of said plurality of buffers;
retrieving graphic contexts from said buffers specified by said identifiers and said specifying information in said graphic element lists; and
rendering said graphic element lists into a frame buffer in accordance with said specified graphic contexts.

17. The method of claim 16, further comprising controlling a sequence in which said graphic element lists are rendered in accordance with respective priorities thereof.

18. The method as claimed in claim 16, further comprising blocking some graphic element lists in response to a code included in another graphic element list.

* * * * *